United States Patent
David et al.

(10) Patent No.: US 9,012,819 B2
(45) Date of Patent: Apr. 21, 2015

(54) BEARING HEATER

(75) Inventors: Sébastien David, Amstel (NL); Sylvain Humbert, Saizerais (FR)

(73) Assignee: Aktiebolaget SKF, Gothenburg (SE)

( * ) Notice: Subject to any disclaimer, the term of this patent is extended or adjusted under 35 U.S.C. 154(b) by 994 days.

(21) Appl. No.: 13/121,768

(22) PCT Filed: Sep. 30, 2008

(86) PCT No.: PCT/EP2008/063075
§ 371 (c)(1),
(2), (4) Date: Jun. 14, 2011

(87) PCT Pub. No.: WO2010/037414
PCT Pub. Date: Apr. 8, 2010

(65) Prior Publication Data
US 2011/0226757 A1    Sep. 22, 2011

(51) Int. Cl.
*F16C 35/063* (2006.01)
*C21D 1/42* (2006.01)
*C21D 9/40* (2006.01)
*H05B 1/02* (2006.01)

(52) U.S. Cl.
CPC .............. *F16C 35/063* (2013.01); *C21D 1/42* (2013.01); *C21D 9/40* (2013.01); *H05B 1/0227* (2013.01)

(58) Field of Classification Search
CPC ............ H05B 6/102; C21D 9/40; C21D 9/32; C21D 1/10; C21D 1/42
USPC ................. 219/635, 660, 647, 661, 640, 652; 266/129
See application file for complete search history.

(56) References Cited

U.S. PATENT DOCUMENTS

| | | | | |
|---|---|---|---|---|
| 2,400,472 A | * | 5/1946 | Strickland, Jr. ................ | 219/600 |
| 3,008,025 A | * | 11/1961 | Alf ................................. | 219/645 |
| 3,849,625 A | * | 11/1974 | Trine ............................. | 219/670 |
| 3,929,523 A | * | 12/1975 | Kinoshi et al. ................ | 148/526 |
| 4,023,988 A | * | 5/1977 | Stickels et al. ................ | 148/622 |
| 4,109,127 A | * | 8/1978 | Frungel ......................... | 219/635 |
| 4,281,234 A | * | 7/1981 | Dohogne ....................... | 219/635 |
| 4,675,488 A | * | 6/1987 | Mucha et al. ................. | 219/640 |
| 4,904,094 A | * | 2/1990 | Furumura et al. ............. | 384/492 |
| 5,256,211 A | * | 10/1993 | Silgailis et al. ............... | 148/108 |
| 5,495,094 A | * | 2/1996 | Rowan et al. ................. | 219/645 |
| 5,853,660 A | * | 12/1998 | Murakami et al. ............ | 420/104 |
| 6,187,118 B1 | * | 2/2001 | Nierlich ........................ | 148/664 |
| 6,259,076 B1 | * | 7/2001 | Gezarzick et al. ............ | 219/639 |
| 6,306,230 B1 | * | 10/2001 | Hengerer ....................... | 148/653 |
| 6,531,000 B1 | * | 3/2003 | Takemura et al. ............. | 148/286 |
| 7,950,857 B2 | * | 5/2011 | Glueck ......................... | 384/476 |
| 2008/0298733 A1 | * | 12/2008 | Glueck ......................... | 384/476 |

FOREIGN PATENT DOCUMENTS

| | | |
|---|---|---|
| DE | 202004011590 U1 | 9/2004 |
| DE | 102004037067 B3 | 1/2006 |
| EP | 0143091 A1 | 5/1985 |
| JP | 2008020003 A | 1/2008 |

* cited by examiner

*Primary Examiner* — Henry Yuen
*Assistant Examiner* — Lawrence Samuels
(74) *Attorney, Agent, or Firm* — Bryan Peckjian; SKF USA Inc. Patent Dept.

(57) ABSTRACT

Improved induction heating of a rolling bearing without the risk of damaging or blocking the bearing is achieved by controlling the heating cycle as a function of the temperature difference between the inner and outer bearing rings and/or dividing the heating cycle into different portions using different power combinations of at least two induction coils.

4 Claims, 1 Drawing Sheet

BEARING HEATER

FIELD OF THE INVENTION

This invention relates to induction heating of annular rolling elements bearings having rolling elements, typically balls or rollers, arranged between an inner bearing ring and an outer bearing ring. Thermal expansion of such rolling bearings induced by induction heating is used, for example, to facilitate the mounting of the bearing on a shaft and/or to obtain an interference fit on the shaft as the bearing cools.

BACKGROUND OF THE INVENTION

One known type of bearing induction heater, described in EP0143091A1, heats the bearing to the extent desired by suitably determining the duration of the heating phase. This document also describes a phase for demagnetising the bearing immediately following induction heating.

Another type of bearing induction heater heats the bearing until a desired measured temperature of the bearing is reached.

The desired heating time and/or temperature for a particular bearing is generally determined empirically and presented to the user of the induction heater in the form of a reference table.

Induction heating times are of the order of 3-4 minutes for small rolling bearings and 20-30 minutes or more for larger bearings. Decreasing the heating time required for a particular bearing is highly desirable. However, whilst increasing the induction power of the heater would reduce the heating time, care must be taken to avoid locking or damaging the bearing due to the inner ring heating and thus expanding more quickly than the outer ring.

SUMMARY OF THE INVENTION

According to one of its aspects, the invention provides a method of heating a rolling elements bearing using an induction heater comprising the sequential steps of:
  using a first portion of a heating cycle to rapidly raise the temperature of an inner ring of the rolling bearing;
  triggering a change over from the first portion of the heating cycle to a second portion of the heating cycle based on a trigger selected from at least one of (i) elapsed time and (ii) an indication of the temperature difference between inner and outer rings of the rolling bearing;
  using the second portion of the heating cycle to raise the temperature of the inner ring of the rolling bearing at a rate lower than that during the first portion of the heating cycle.

During a first portion of the heating cycle, the bearing may be heated at high power, thus minimising the overall duration of the heating cycle; during this portion of the heating cycle, the temperature of the inner bearing ring will generally increase more quickly than that of the outer bearing ring. At a point in the heating cycle when increasing the temperature difference between the inner and outer bearing rings would carry a risk of damaging or blocking the bearing, the first portion of the heating cycle is terminated. Preferably, the end of the first portion of the heating cycle is triggered by continuously or periodically measuring the temperature of the inner and outer bearing rings, providing inner ring and outer ring temperature signals to inputs of a control circuit of the induction heater and ending the first portion of the heating cycle when a comparison between these input signals indicates that a predetermined temperature difference has been reached. The end of the first portion of the heating cycle may be triggered when comparison between the signals indicates a temperature difference of about 30° C. or more. Alternatively, the end of the first portion of the heating cycle may be triggered after a pre-determined time or after a pre-determined proportion, for example 50% or 60%, of the total duration of the heating cycle has elapsed. The total duration of the heating cycle and/or the trigger conditions for ending the first portion of the heating cycle may be set as a function of the size of the bearing to be heated, for example by an input to the control circuit given by the user of the induction heater.

Preferably, a second portion of the heating cycle commences simultaneously with the ending of the first portion of the heating cycle. Alternatively, there may be a time delay between the ending of the first portion of the heating cycle and the start of a second portion of the heating cycle. During the second portion of the heating cycle, the bearing is preferably heated such that the rate of temperature rise of the inner ring is lower than that during the first portion of the cycle. This may be achieved by using a reduced power during the second portion of the cycle and/or adapting the power configuration of individual coils of the induction heater where multiple coils are used.

During the second portion of the heating cycle, there is preferably a reduction in the temperature difference between the inner and outer bearing rings. This may be achieved by a combination of heat transfer from the inner bearing ring to the outer bearing ring (by radiation and/or conduction and/or convection) and induction heating. The combination of the first and second portions of the heating cycle allows an optimisation of the overall heating time whilst reducing the risk of damaging the bearing.

Preferably, the power configuration applied to the coil(s) of the induction heater remains substantially constant during each individual portion of the heating cycle. This may reduce the overall heating time by permitting the fastest heating rate compatible with each portion of the cycle to be used for the entire duration of that portion of the heating cycle. Alternatively, the power configuration may be modified during a portion of the heating cycle, for example, the total power being reduced during an individual portion of the heating cycle so as to reduce the rate of temperature rise as a function of time during that portion of the heating cycle.

During each portion of the heating cycle, power is supplied to the induction heater such that there is a rise in temperature of the bearing, preferably of the inner bearing ring. Thus, the portions of the heating cycle are not equivalent to periods at which no power is supplied to the induction heater or to a demagnetising cycle during which power supplied to the coils of the induction heater serves to demagnetise the bearing without increasing or with minimal increase of its temperature.

The heating cycle may have two, three, four, five or more portions, each portion of the heating cycle having a different power configuration or combination from the previous portion of the heating cycle.

According to another aspect, the present invention provides a rolling elements bearing induction heater having a heating cycle control circuit adapted to control at least one induction coil, in which the control circuit comprises
  an inner ring temperature signal input and
  an outer ring temperature signal input.

This may be used to allow a comparison between the inner and outer ring temperatures to act as a trigger for the heating cycle, for example to end the heating cycle or a portion of the heating cycle and/or to start a portion of the heating cycle. Preferably, the conditions giving rise to a trigger based on the inner and outer temperature input signals are determined by the control circuit; they may be programmed in to the control circuit. Alternatively, the trigger conditions may be based on a user input, for example, an indication of the maximum temperature difference recommended when heating a particular bearing.

Different power combinations may be used in different portions of the heating cycle.

According to a further aspect, the present invention provides a rolling elements bearing induction heater having a heating cycle control circuit in which
  the induction heater comprises at least first and second induction coils; and
  the control circuit is adapted to control (i) a first portion of the heating cycle in which a first power combination is applied to the induction coils and (ii) a second portion of the heating cycle in which a second power combination is applied to the induction coils.

Where the induction heater has multiple coils, a difference in power combination may be achieved by changing the power supplied to at least one of the coils. During a portion of the heating cycle adapted for rapidly raising the temperature of the inner bearing ring, power may be supplied or essentially supplied to at least one coil having an axis substantially perpendicular to the axis of the bearing and/or to a coil passing through the internal diameter of the bearing. During a portion of the heating cycle adapted for slower temperature rise of the bearing and reduction in temperature difference between the inner and outer bearing rings, power may be supplied or essentially supplied (i) to a coil having its axis substantially parallel to the axis of the bearing and positioned on the core of the induction heater substantially opposite the bearing and/or (ii) to at least one coil having an axis substantially perpendicular to the axis of the bearing.

Where the induction heater comprises multiple coils at least two and preferably all of the coils may be individually controllable.

Individual features disclosed in relation to any particular aspect of the invention may be combined with other aspects of the invention. Preferred and/or alternative embodiments are defined in the dependent claims.

BRIEF DESCRIPTION OF THE SEVERAL VIEWS OF THE DRAWINGS

Embodiments of the invention will now be described, by way of example only, with reference to the accompanying drawings.

DETAILED DESCRIPTION OF THE INVENTION

Figure 1:
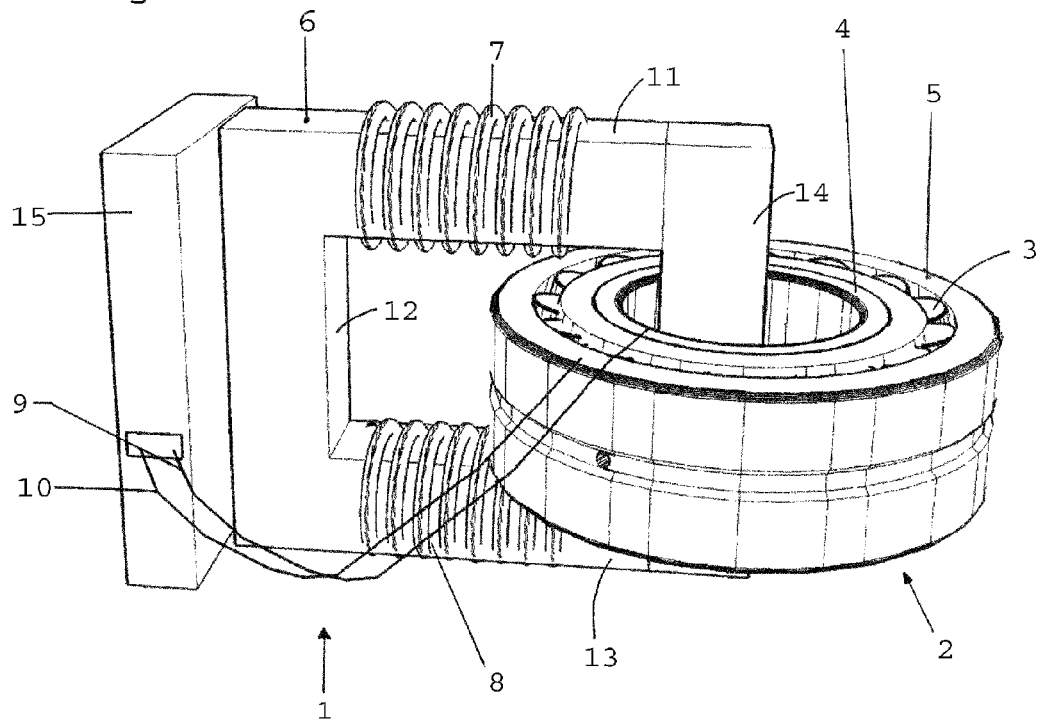
FIG. 1 is a perspective view of one embodiment of the invention.

FIG. 1 shows a induction heater 1 for heating a rolling elements bearing 2 having a set of rollers 3 arranged between its inner 4 and outer 5 bearing rings. The induction heater comprises:
  a ferromagnetic core 6 provided with first 7 and second 8 coils;
  a control circuit (not shown) housed within a cabinet 15;
  an inner ring temperature probe 9; and
  an outer ring temperature probe 10.

The core 6 has first 11, second 12 and third 13 arms forming an integral U shaped core section and a fourth arm 14 which is positioned across the open arms of the U shaped core section to complete the magnetic circuit of the core 6. The fourth arm 14 of the core 2 is moveable to allow the rolling bearing 2 to be arranged for heating (such that one arm of the core passes through its internal diameter) and subsequently removed from the induction heater 1.

The second coil 8 may be positioned on the second 12, third 13 or fourth 14 arms of the core 6.

Each of the temperature probes 9, 10 is provided by a magnetic thermocouple. The inner temperature probe 9 is connected to the inner ring 4 of the bearing 2 and provides a temperature signal to an inner ring temperature signal input (not shown) of the control circuit. Similarly, outer temperature probe 10 is connected to the outer ring 5 of the bearing 2 and provides a temperature signal to an outer ring temperature signal input (not shown) of the control circuit.

It is often desired to raise the temperature of the bearing 2 to about 90° above the temperature of a shaft on which it is to be mounted; this creates an appropriate mounting clearance. Where the shaft is at an ambient temperature of 20° C., the bearing should thus be raised to a temperature of about 110° C. Alternative temperatures may be achieved when desired.

When activated, the control circuit of the induction heater 1 allows high voltage, low current AC voltage to be applied across one or more of the coils 7,8. This induces, via the magnetic material of the core 6, a high current within the bearing 2 which raises the bearing temperature. The inner bearing ring 4 will generally heat up more quickly than the outer bearing ring 5. When the input signals to the control circuit from the temperature probes 9,10 indicate that the difference in temperature between the inner bearing ring 4 and the outer bearing ring 5 reaches a critical value, the power supplied to the coils 7,8 is adjusted by the control circuit to avoid the risk of locking or damaging the bearing due to the difference in thermal expansion between the inner 4 and outer 5 rings. The adjustment may be, for example, a reduction in the power supplied or an interruption in the power supplied. Typically, the control circuit will be configured to avoid the temperature difference between the inner 4 and outer 5 rings exceeding 30° C.

Figure 2:
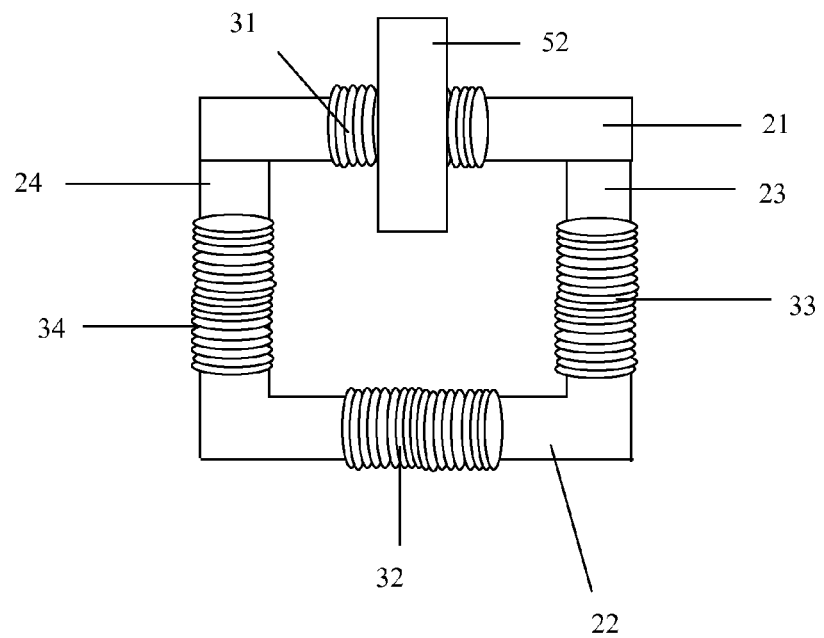
FIG. 2 is a schematic view of a coil arrangement of an alternative embodiment.

FIG. 2 illustrates an arrangement for an induction heater for heating a rolling bearing in which first 21, second 22, third 23 and forth 24 arms of a core are each provided with respective first 31, second 32, third 33 and fourth 34 coils. A bearing 52 to be heated is arranged with the first arm 21 and first coil 31 passing through its internal diameter. Inner ring and outer ring temperature probes (not shown) are arranged as described in relation to the embodiment of FIG. 1.

The arrangement is operated using the following heating cycle:

First portion of heating cycle:

| Coil | Power applied to coil |
| --- | --- |
| First coil 31 | High power C31P1, preferably 80-100% |
| Second coil 32 | Low power C32P1 or no power, preferably 0-20% |
| Third coil 33 | High power C33P1, preferably 80-100% |
| Fourth coil 34 | Optionally high power C34P1, preferably 80-100% |

This induces a rapid rise in the temperature of the inner bearing ring 4 but a slower rise in temperature of the outer bearing ring 5. This portion of the heating cycle leads to rapid heating of the bearing but to a relatively high temperature difference between the inner 4 and outer 5 bearing rings.

Second portion of heating cycle:

| Coil | Power applied to coil |
| --- | --- |
| First coil 31 | Reduced power C31P2, less than that used during the first portion of the heating cycle, preferably 0-20% |
| Second coil 32 | High power C32P2, greater than that used during the first portion of the heating cycle, preferably 80-100% |
| Third coil 33 | Reduced power C33P2, less than that used during the first portion of the heating cycle, preferably 0-20% |
| Fourth coil 34 | Reduced power C34P2, less than that used during the first portion of the heating cycle, or off, preferably 0-20% |

This induces an increase in the temperature of the inner bearing ring 4 which is slower than that during the first portion of the cycle and an increase in the temperature of the outer bearing ring 5 which, although relatively slow, is faster than that during the first portion of the cycle.

The switch between the first and second portions of the heating cycle may be initiated:
- On a temperature control mode, for example when the inner and outer ring temperature inputs to the control circuit indicate that a predetermined difference (eg 30° C.) in the inner and outer ring temperatures has been reached; or
- On a time control mode, for example when a set time or set proportion of the total heating time (eg 50% of the total heating time has elapsed).

The invention claimed is:

1. A method of heating an assembled rolling bearing using an induction heater, the method comprising the steps of:
   providing the assembled rolling bearing;
   heating the assembled rolling bearing using a heating cycle;
   using a first portion of the heating cycle to rapidly raise the temperature of the assembled rolling bearing wherein an inner ring of the assembled rolling bearing heats up at a higher rate than an outer ring of the assembled rolling bearing;
   triggering a change over from the first portion of the heating cycle to a second portion of the heating cycle based on a trigger selected from at least one of (i) elapsed time and (ii) an indication of the temperature difference between inner and outer rings of the rolling bearing;
   using the second portion of the heating cycle to raise the temperature of the assembled rolling bearing such that the inner ring of the assembled rolling bearing heats up at a rate lower than that during the first portion of the heating cycle,
   triggering a change over from the second portion of the heating cycle to a third portion of a heating cycle based on a trigger selected from (i) elapsed time and (ii) an indication of the temperature difference between the inner and outer rings of the assembled rolling bearing;
   using the third portion of the heating cycle to raise the temperature of the assembled rolling bearing such that the inner ring of the assembled rolling bearing heats up at a rate higher than that during the second portion of the heating cycle.

2. The method of claim 1, further comprising the steps of:
   simultaneously monitoring the temperature of the inner ring and the outer ring of the assembled rolling bearing during the heating cycle.

3. A method of heating an assembled rolling bearing using an induction heater, the method comprising the steps of:
   providing the assembled rolling bearing;
   heating the assembled rolling bearing using a heating cycle wherein the heating cycle contains at least two portions, and the heating cycle constantly and continuously supplies heat to the assembled rolling bearing throughout the entire heating cycle such that the heating cycle raises a temperature of the assembled rolling bearing throughout the entire heating cycle;
   using a first portion of the heating cycle to rapidly raise the temperature of the assembled rolling bearing wherein an inner ring of the assembled rolling bearing heats up at a higher rate than an outer ring of the assembled rolling bearing;
   triggering a change over from the first portion of the heating cycle to a second portion of the heating cycle based on a trigger selected from at least one of (i) elapsed time and (ii) an indication of the temperature difference between inner and outer rings of the rolling bearing;
   using the second portion of the heating cycle to raise the temperature of the assembled rolling bearing such that the inner ring of the assembled rolling bearing heats up at a rate lower than that during the first portion of the heating cycle,
   triggering a change over from the second portion of the heating cycle to a third portion of a heating cycle based on a trigger selected from (i) elapsed time and (ii) an indication of the temperature difference between the inner and outer rings of the assembled rolling bearing;
   using the third portion of the heating cycle to raise the temperature of the assembled rolling bearing such that the inner ring of the assembled rolling bearing heats up at a rate higher than that during the second portion of the heating cycle.

4. The method of claim 3, further comprising the steps of:
   simultaneously monitoring the temperature of the inner ring and the outer ring of the assembled rolling bearing during the heating cycle.

* * * * *